US006697705B2

(12) United States Patent
Johnson et al.

(10) Patent No.: US 6,697,705 B2

(45) Date of Patent: Feb. 24, 2004

(54) FUEL DISPENSING METHOD FOR REFUELING FROM MASTER AND SATELLITE DISPENSERS

(75) Inventors: William S. Johnson, Jamestown, NC (US); Edward A. Payne, Greensboro, NC (US)

(73) Assignee: Gilbarco Inc., Greensboro, NC (US)

(*) Notice: Subject to any disclaimer, the term of this patent is extended or adjusted under 35 U.S.C. 154(b) by 18 days.

(21) Appl. No.: 10/314,043

(22) Filed: Dec. 6, 2002

(65) Prior Publication Data

US 2003/0065422 A1 Apr. 3, 2003

Related U.S. Application Data

(62) Division of application No. 09/285,150, filed on Apr. 1, 1999, now Pat. No. 6,529,800.

(51) Int. Cl.[7] ................................................ G06F 17/00

(52) U.S. Cl. ......................... 700/236; 700/244; 191/94; 222/71; 705/413

(58) Field of Search ................................. 700/231, 232, 700/240, 241, 242, 244, 236; 222/52, 71, 74, 75, 135, 1; 141/94; 705/413; 73/40

(56) References Cited

U.S. PATENT DOCUMENTS

| | | | | |
|---|---|---|---|---|
| 3,878,377 | A | 4/1975 | Brunone | 235/151 |
| 3,895,738 | A | 7/1975 | Buchanan et al. | 222/26 |
| 3,949,207 | A | 4/1976 | Savary et al. | 235/151 |
| 4,216,529 | A | 8/1980 | Krystek et al. | 364/510 |
| 4,247,899 | A | 1/1981 | Schiller et al. | 364/465 |
| 4,250,550 | A | 2/1981 | Fleischer | 364/465 |
| 4,360,877 | A | 11/1982 | Langston et al. | 364/465 |
| 4,550,859 | A | 11/1985 | Dow, Jr. et al. | 222/26 |
| 4,589,069 | A | 5/1986 | Endo et al. | 364/405 |
| 5,040,577 | A | 8/1991 | Pope | 141/59 |
| 5,325,706 | A | 7/1994 | Grose | 73/40 |
| 5,394,336 | A | 2/1995 | Warn et al. | 364/479 |
| RE35,238 | E | 5/1996 | Pope | 141/59 |
| 5,542,458 | A | 8/1996 | Payne et al. | 141/7 |
| 5,586,586 | A | 12/1996 | Fiech | 141/98 |
| 5,596,501 | A | 1/1997 | Comer et al. | 364/464 |
| 5,797,470 | A | 8/1998 | Bohnert et al. | 186/53 |
| 6,230,939 | B1 | 5/2001 | Willeke et al. | 222/173 |
| 6,529,800 | B1 * | 3/2003 | Johnson et al. | 700/236 |

* cited by examiner

*Primary Examiner*—Khoi H. Tran
(74) *Attorney, Agent, or Firm*—Withrow & Terranova PLLC

(57) ABSTRACT

A control system for a fuel dispensing system and a method for simultaneously refueling from at least two fuel dispensers to provide a single transaction total wherein the two fuel dispensers are a master/satellite fuel dispenser pair. A first communication means enables the dispenser control circuitry in the master dispenser to control the dispensing of fuel from the satellite dispenser. A second communication means enables the dispenser control circuitry to receive data regarding the amount of fuel dispensed by the satellite dispenser. A combination means generally associated with the dispenser control circuitry combines the total amount of fuel dispensed from the master/satellite fuel dispenser pair to a single vehicle. A device mounted on the master dispenser displays the total volume and price for the customer as a single transaction.

8 Claims, 3 Drawing Sheets

FUEL DISPENSING METHOD FOR REFUELING FROM MASTER AND SATELLITE DISPENSERS

This is a divisional application of application Ser. No. 09/285,150, filed Apr. 1, 1999 U.S. Pat. No. 6,529,800.

BACKGROUND OF THE INVENTION

The present invention relates broadly to fuel dispenser control systems and, more particularly, to a method and control system for providing a single transaction record of a fueling event in which two dispensers, a master and a satellite, are used to fill multiple tanks of a single vehicle at a refueling station.

Large vehicles, such as recreational vehicles and trucks, may be equipped with two or more fuel tanks, often with separate tanks on either side of the vehicle. It would be advantageous to be able to fuel both tanks simultaneously with a single total fluid volume and price displayed for the customer for the total transaction. As used throughout this disclosure, the term "simultaneously" refers to the substantially contemporaneous refueling of multiple fuel tanks of a single vehicle during a single visit to a refueling station and is not intended to require that the fueling of each tank begin and end at the exact same time.

Currently, simultaneous fueling may occur from separate dispensers which render separate volume and price totals. The totals must then be added by an operator or attendant prior to payment. This delays the customer's transaction time since the customer cannot pay for the combined transaction at the pump. In addition, requiring the operator or attendant to add the two totals increases the potential for miscalculation due to human error. A computer software program or function could be written to add the two totals; however, such an option would be difficult and expensive to implement because the program or function would have to be customized for each fueling station at which it would be used.

One hardware approach to the problem is based on hydraulics. A branch pipe can be taken from one dispenser and routed to a second dispenser so that the flow of fuel is split between two separate delivery systems. Certain disadvantages exist with this approach. First, the flow rate of fuel to the combined delivery system is no higher than for a system that dispenses fuel at only one dispenser with one hose in operation, thereby increasing the time it takes to fill the vehicle's multiple tanks. Second, electronic vapor recovery systems, similar to that shown in U.S. Pat. No 5,404,577, will not work with such hydraulic systems. The reason for this is because operation of such vapor control systems is dependent on flow registering meters and their accompanying data pulsers. Since all fuel flows from one dispenser in a hydraulic system, the meters and data pulsers of the second dispenser do not operate, which, in turn, means that, the vapor recovery system remains inoperative. Third, hydraulic systems require additional piping which increases the potential for leaks. Fourth, it is difficult or expensive to retrofit existing refueling stations with such hydraulics.

SUMMARY OF THE INVENTION

It is an object of the present invention to provide a fuel dispensing method and control system, which will provide a single transaction total from a simultaneous fueling event using a master and satellite fuel dispenser pair.

It is a further object of the present invention to provide such a method and control system for simultaneous refueling, which can be used with vapor recovery systems.

It is another object of the present invention to provide such a method and control system for simultaneous refueling, which may be used with pump-only dispensers or dispensers equipped with payment card readers.

It is another object of the present invention to provide such a method and control system for simultaneous refueling, which can be installed at existing fueling stations and which can be used with conventional dispenser piping.

Since excess or unnecessary wiring in and around refueling stations poses an increased fire hazard, it is another object of the present invention to minimize the amount of wiring extending between the master and satellite fuel dispensers.

To those ends, the present invention provides a control system for a fuel dispensing system for refueling from at least two fuel dispensers to provide a single transaction total. The two fuel dispensers may be designated as a master/satellite fuel dispenser pair. The master dispenser includes a dispenser control circuitry. The master and satellite dispensers each have valve controls for dispensing fuel, dispensing meters, pulser circuitry associated with the dispensing meters for emitting transactional data signals responsive to meter activity, and a device for displaying at least the volume and price of the fuel dispensed. According to the present invention, the control system comprises a first communication circuit for enabling the dispenser control circuitry to communicate with the valve controls of the satellite dispenser, a second communication circuit for enabling the pulser circuitry of the satellite dispenser to communicate with the dispenser control circuitry, and a combining arrangement for adding the transactional data signals from the satellite dispenser with the transactional data signals from the master dispenser to form combined transactional data signals representative of the total amount of fuel dispensed by the master and satellite dispensers.

In the preferred embodiment, the first communication circuit includes a first multiplexer/demultiplexer associated with the master dispenser, the first multiplexer/demultiplexer converts parallel data signals from the dispenser control circuitry into datastream signal for transmission to the satellite dispenser, and a second multiplexer/demultiplexer associated with the satellite dispenser, the second multiplexer/demultiplexer converts datastream signal from the first multiplexer/demultiplexer into parallel data signals for transmission to the valve controls of the satellite dispenser. The second communication circuit includes the second multiplexer/demultiplexer which converts parallel data signals from the pulser circuitry of the satellite dispenser into datastream signal for transmission to the master dispenser, and the first multiplexer/demultiplexer which converts datastream signal from the second multiplexer/demultiplexer into parallel data-signals for transmission to the dispenser control circuitry.

It is generally understood that this fuel dispensing control system enables at least two tanks of a vehicle to be refueled relatively simultaneously. Further, in the preferred embodiment the transactional data signal is a pulser data signal. In another aspect of the present invention, the combining arrangement, which may include electronic circuitry, computer software, or both, is part of the dispenser control circuitry. Preferably, the combined transactional data signals communicate with the display device of the master dispenser to display the combined volume and price for the total fuel dispensed by the master and satellite dispensers as a single transaction.

It is generally understood that the master and satellite dispensers will each have separate fuel hoses for fuel dispensing. Further, the dispensers should be separated by a physical distance sufficient to accommodate a vehicle for simultaneous refueling there between using both hoses. In another aspect of the present invention, the master and satellite dispensers each are equipped with fuel vapor detection and recovery systems. These systems are operational during fuel dispensing and may include a first vapor recovery circuitry which is associated with the master dispenser and which is in communication with the pulser circuitry of the master dispenser and with the dispenser control circuitry, and a second vapor recovery circuitry which is associated with the satellite dispenser and which is in communication with the pulser circuitry of the satellite dispenser and with the dispenser control circuitry.

The present invention is also adaptable so that a plurality of multi-dispenser housings may be arranged in a substantially linear array wherein the multi-dispenser housings are each separated by a physical distance sufficient to accommodate a plurality of vehicles for simultaneous refueling from a master dispenser in one multi-dispenser housing and a satellite dispenser in an adjacent multi-dispenser housing. In such an array, a multi-dispenser housing will generally include a master dispenser and a satellite dispenser of different master/satellite fuel dispenser pairs. In one preferred embodiment, the plurality of multi-dispenser housings will be bordered by a single dispenser housing containing a master dispenser on one end and by a single dispenser housing containing a satellite dispenser on the other end. In another preferred embodiment, the plurality of multi-dispenser housings may be bordered by a single dispenser housing containing a master dispenser on one end with one side unused and a multi-dispenser housing on the other end containing a satellite dispenser on one side and a standalone dispenser on the other side.

The present invention further includes a method of simultaneously fueling two tanks in a vehicle and displaying at least the volume and price of the total amount of fuel dispensed to the vehicle. The method includes the steps of establishing electronic communication between a first fuel dispenser and a second fuel dispenser, positioning the vehicle between the first fuel dispenser and the second fuel dispenser, connecting a fuel hose from the first fuel dispenser to one tank of the vehicle, dispensing fuel to the vehicle from the first fuel dispenser, connecting a fuel hose from the second fuel dispenser to another tank of the vehicle, dispensing fuel simultaneously to the vehicle from the second fuel dispenser, measuring the volume of fuel dispensed from the first fuel dispenser, measuring the volume of fuel dispensed from the second fuel dispenser, combining the volume measurements from the first and second fuel dispensers, and displaying at least the total combined volume and price of fuel dispensed to the vehicle from the first and second fuel dispensers.

Preferably, the steps of dispensing fuel from both the first and second fuel dispensers further includes the step of controlling the dispensing of fuel from the first and second fuel dispensers with dispenser control circuitry in the first fuel dispenser. It is further preferred that the step of combining the volume measurements from the first and second fuel dispensers include the steps of transmitting volume measurements and fuel price from the first fuel dispenser to dispenser control circuitry in the first fuel dispenser, transmitting volume measurements and fuel price from the second fuel dispenser to dispenser control circuitry in the first fuel dispenser, and combining the volume measurements and fuel prices from the first and second fuel dispensers in the dispenser control circuitry to generate a combined volume measurement and combined price for fuel dispensed to the vehicle from the first and second fuel dispensers.

In the preferred embodiment the method of simultaneously fueling two tanks in a vehicle and displaying at least the volume and price of the total amount of fuel dispensed to the vehicle further includes the step of enabling a person to pay for the total combined volume and price of fuel dispensed from the first and second fuel dispensers with one payment at a payment card reader installed at the first fuel dispenser. It is preferable that the present method further include the steps of detecting first fuel vapor emissions at the connection point between the fuel hose of the first fuel dispenser and one tank of the vehicle, detecting second fuel vapor emissions at the connection point between the fuel hose of the second fuel dispenser and another tank of the vehicle, and recovering a majority of the first and second fuel vapor emissions.

In another embodiment of the present invention, the method of simultaneously fueling two tanks in a vehicle and displaying at least the volume and price of the total amount of fuel dispensed to the vehicle may be varied so that multiple vehicles may be fueled simultaneously in an array of refueling stations. The method of electronically linking a first and second fuel dispenser further includes the steps of placing a first fuel dispenser and a second fuel dispenser in a multi-dispenser housing, arranging a plurality of multi-dispenser housings in an array with a physical distance between each multi-dispenser housing sufficient to accommodate a vehicle between each multi-dispenser housing and sufficient to accommodate a plurality of vehicles within the array, and establishing electronic communication between the first fuel dispenser in one multi-dispenser housing with the second fuel dispenser in an adjacent multi-dispenser housing.

In one embodiment, this method of fueling in an array of multi-dispenser housings may further comprise the steps of placing a single dispenser housing with a first fuel dispenser at one end of the array of multi-dispenser housings and placing a single dispenser housing with a second fuel dispenser at the other end of the array of multi-dispenser housings. In another embodiment, this method of fueling in an array of multi-dispenser housings may further comprise the steps of placing a single dispenser housing with a first fuel dispenser at one end of the array of multi-dispenser housings and placing a multi-dispenser housing at the other end of the array of multi-dispenser housings, wherein the first fuel dispenser of the multi-dispenser housing at the other end of the array is a stand-alone fuel dispenser.

By the above, the present invention provides an effective system and method whereby simultaneous refueling of a vehicle may be accomplished with a single transaction total being provided for the customer, operator, or attendant. The present invention overcomes problems inherent with prior art methods and control systems and does so in a manner wherein existing dispensers may be retrofitted and converted to master/satellite fuel dispensing systems. Additionally, the present invention allows existing safety measures to remain in place and does not require extensive redesign of the fuel dispenser itself.

DESCRIPTION OF THE PREFERRED EMBODIMENT

Figure 1:
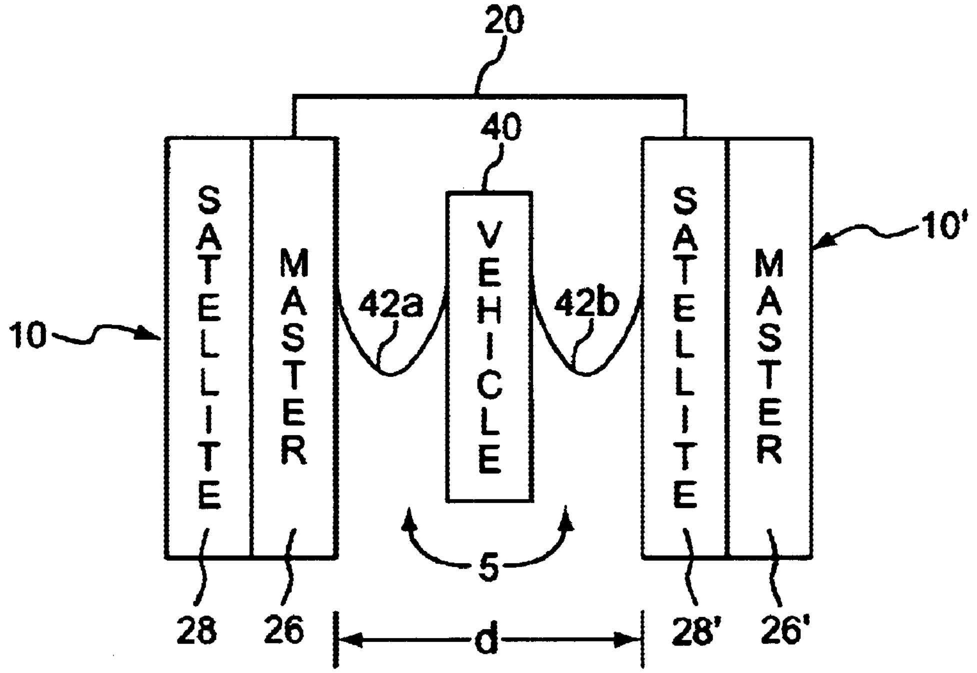
FIG. 1 is a diagrammatic view of a vehicle with two tanks being fueled simultaneously at a single refueling station having a master/satellite fuel dispenser pair according to the present invention.
Figure 3:
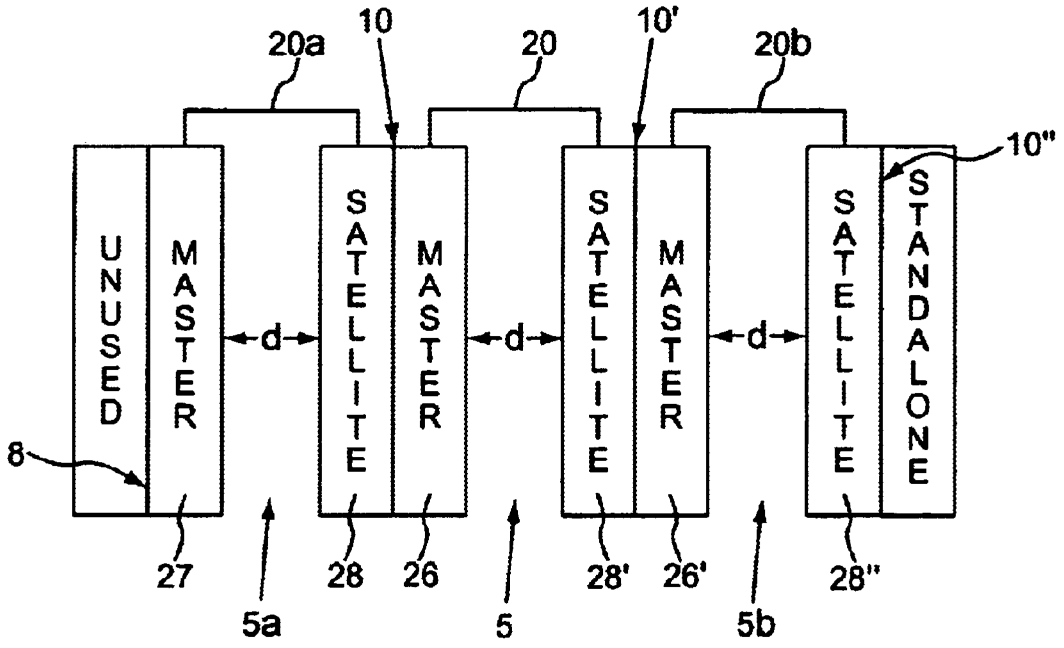
FIG. 3 is a diagrammatic view of an array of refueling stations wherein multiple master/satellite fuel dispenser pairs provide multiple lanes for refueling.
Figure 4:
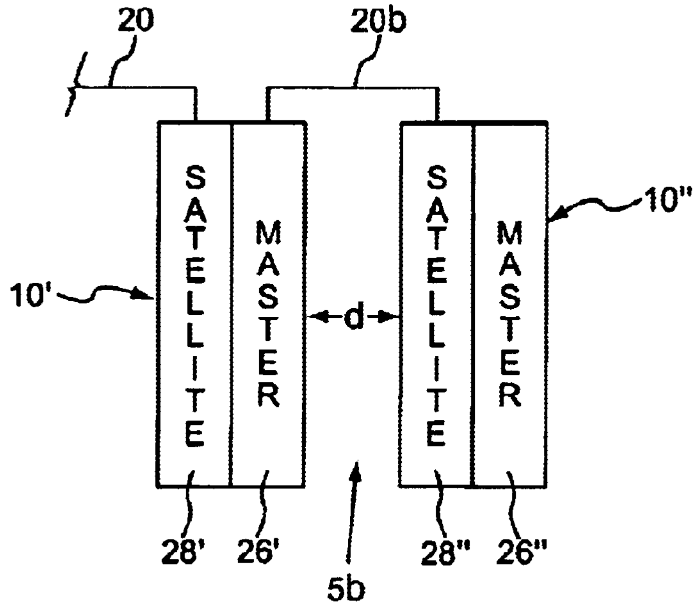
FIG. 4 is a partial diagrammatic view of another embodiment of the present invention having an additional master dispenser on one end of an array of refueling stations.

FIG. 1 illustrates a single refueling station 5, which may be part of an array of refueling stations with multiple master/satellite fuel dispenser pairs as illustrated more fully in FIGS. 3 and 4. FIG. 1 illustrates a housing 10 containing two fuel dispensers 26, 28, and a housing 10' containing two fuel dispensers 26', 28'. Housings 10 and 10' are disposed opposite one another at a predetermined spacing—d—, which creates a lane of sufficient width to allow a vehicle 40 therein for refueling, and FIG. 1 illustrates the vehicle 40 being fueled simultaneously through hoses 42*a*, 42*b*.

As will be explained more fully below, fuel dispensers 26 and 26' are "master" fuel dispensers and fuel dispensers 28 and 28' are "satellite" fuel dispensers. Master dispenser 26 is in electrical communication with satellite dispenser 28' using conventional wiring. The conventional wiring of the present invention preferably uses a twisted pair wire set 20 to allow data exchange between master dispenser 26 and satellite dispenser 28' and to take advantage of limited space available in existing conduit between housings 10 and 10', but other known wiring could also be used.

Figure 2:
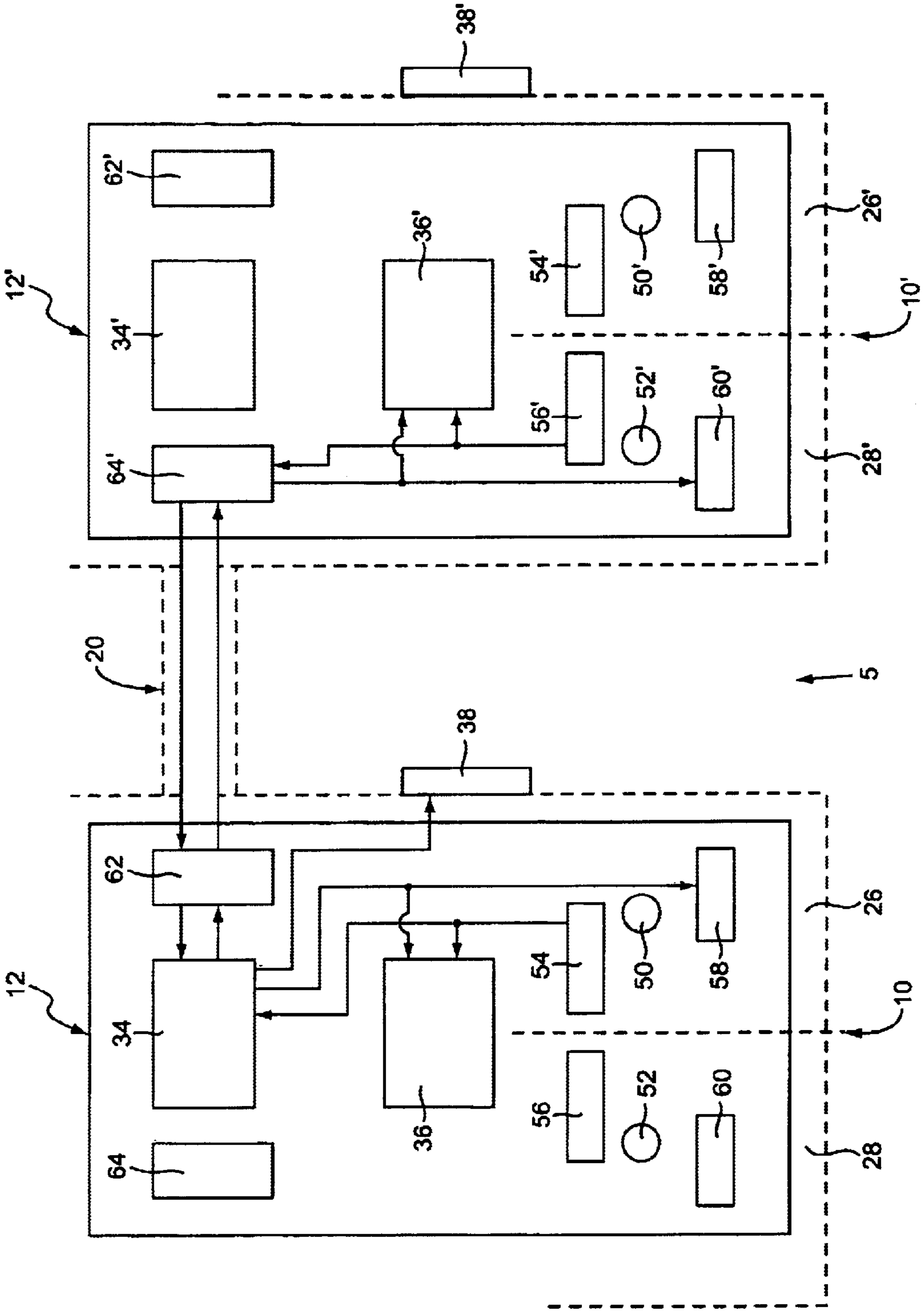
FIG. 2 is a diagrammatic view of the control system for a master/satellite fuel dispenser pair according to the present invention.

Turning now to FIG. 2, the electronic arrangement of the control system for a fuel dispensing system according to the present invention is illustrated in block diagram form. The electronic arrangement illustrated would be the same whether the master/satellite dispenser pair is part of a single refueling station or part of an array of refueling stations. Accordingly, control diagrams 12, 12' illustrate the interlinked nature of the control system of the present invention, portions of which are contained within both housings 10 and 10' and which connect master dispenser 26 with satellite dispenser 28'. For clarity of illustration, the electronic flow diagram is shown only for master dispenser 26, satellite dispenser 28', and their interconnection. Nevertheless, it should be generally understood that the flow diagram of the control system for master dispenser 26' mirrors that of master dispenser 26 and, likewise, the flow diagram of the control system for satellite dispenser 28 mirrors that of satellite dispenser 28'. This inter-linked control system design can be repeated numerous times to accommodate additional refueling stations as shown in FIGS. 3 and 4. Likewise, it should be generally understood that like reference numerals refer to like components with a prime (') or double-prime (") after the reference numeral merely indicating the housing in which the component is located.

Specifically, the flow of fuel from master dispenser 26 is regulated by valve controls 58, which are in electrical communication with and controlled by dispenser control circuitry 34. Dispenser control circuitry 34 is also in electrical communication with a vapor recovery control circuit 36. As fuel flows from master dispenser 26, the quantity of fuel dispensed is recorded by a meter 50. Meter 50 is associated with pulser circuitry 54, which transmits transactional data, preferably pulser data signals, to the vapor recovery control circuitry 36 and to the dispenser control circuitry 34. The transactional data of pulser circuitry 54 electronically communicates the amount of fuel dispensed by master dispenser 26, as measured by meter 50. Vapor recovery control circuit 36 processes the electronic information received from dispenser control circuitry 34 and pulser circuitry 54 to control the conventional vapor recovery system (not shown) of master dispenser 26.

Correspondingly, the flow of fuel from satellite dispenser 28' is regulated by valve controls 60', which are in electrical communication with and controlled by dispenser control circuitry 34 in housing 10. The electrical communication between housing 10 and 10' will be described in greater detail below. Dispenser control circuitry 34 is also in electronic communication with the vapor recovery control circuit 36'. As fuel flows from satellite dispenser 28', the quantity of fuel dispensed is recorded by a meter 52'. Meter 52' is associated with pulser circuitry 56', which transmits transactional data, preferably pulser data signals, to the vapor recovery control circuitry 36' and to the dispenser control circuitry 34. The transactional data of pulser circuitry 56' electronically communicates the amount of fuel dispensed by satellite dispenser 28', as measured by meter 52'. Vapor recovery control circuit 36' processes the electronic information received from dispenser control circuitry 34 and pulser circuitry 56' to control the conventional vapor recovery system (not shown) of satellite dispenser 28'.

The immediately preceding description of dispenser operational electronics in the master dispenser 26 and the satellite dispenser 28' is generally known, and the vapor recovery system is described in U.S. Pat. No. 5,040,577.

The electronic communication between housings 10 and 10' and, correspondingly, between master dispenser 26 and satellite dispenser 28' is as follows. Since dispenser control circuitry 34 sends and receives electronic communication in parallel data format, it is possible to run a parallel or serial datastream electrical cable between housings 10 and 10'. However, serial datastream cabling may be preferable over parallel datastream cabling for several reasons, especially for existing refueling stations that are being retrofitted with this invention. As stated previously, the present invention advantageously uses a twisted pair wire set 20 to allow data exchange between master dispenser 26 and satellite dispenser 28'. The twisted pair wire set 20 can be run through an existing conduit of a predetermined size (not shown) between housings 10 and 10', which may be too small to accommodate a parallel data cable. This solution reduces the risk of fire since the electronic cables between the housings are not exposed to fuel or fuel vapors and does not require the installation of additional conduits between housings 10 and 10'. Also, parallel electric cabling may not be desired, because the parallel data is low voltage signal wiring and would have to be amplified to travel the necessary distances. Converting to serial data allows bi-directional communication which is more conducive with use of circuits that are more immune to noise.

To take advantage of the twisted pair wire set 20 according to the preferred embodiment of the present invention, a master multiplexer/demultiplexer circuit 62 is disposed within housing and is in electronic communication (parallel data format) with the dispenser control circuitry 34. A satellite multiplexer/demultiplexer circuit 64' is disposed within housing 10' and is in electronic communication (parallel data format) with valve controls 60', vapor recovery control circuit 36', and pulser circuitry 56'. The multiplexers/demultiplexers 62, 64' have the ability to convert parallel datastreams to serial datastreams and vice versa. Thus, multiplexers/demultiplexers 62, 64' communicate with each other in serial format via twisted pair wire set 20.

More specifically, the master multiplexer/demultiplexer 62 receives valve control data in parallel format from the dispenser control circuitry 34. Master multiplexer/demultiplexer 62 converts that data to a serial datastream and transmits the serial datastream to the satellite multiplexer/demultiplexer 64' via one bidirectional twisted pair wire set 20. The satellite multiplexer/demultiplexer 64' receives the serial datastream from the master multiplexer/demultiplexer 62, converts that data into parallel format, and transmits that parallel datastream to valve controls 60' and vapor recovery control circuit 36'.

In reverse, the satellite multiplexer/demultiplexer 64' receives transactional data, such as pulser data signals, in parallel format from the pulser circuitry 56'. Satellite multiplexer/demultiplexer 64' converts that data to a serial datastream and transmits the serial datastream to the master multiplexer/demultiplexer 62 via the other bi-directional twisted pair wire set 20. The master multiplexer/demultiplexer 62 receives the serial datastream from the satellite multiplexer/demultiplexer 64', converts that data into parallel format, and transmits that parallel datastream to dispenser control circuitry 34.

The transactional data signals or pulser data signals from the pulser circuitry 54 of the master dispenser 26 and from the pulser circuitry 56' of the satellite dispenser 28' are combined or added within the dispenser control circuitry 34. This combination or addition can be performed by electronic circuitry within the dispenser control circuitry 34, by including a function within the computer software that operates and controls the dispenser control circuitry 34, or by a combination of two. All three of these options are conventional.

The dispenser control circuitry 34 is in electronic communication with a display and control interface 38 mounted on the outside of housing 10. The combined transactional data signal indicating the total amount and total price of fuel dispensed from the master/satellite dispenser pair 26, 28' can be utilized to generate a display of the total volume of fuel dispensed and total price of such fuel on display and control interface 38. As is conventional, display and control interface 38 may also be equipped with a payment card reader, such a CRIND™, which is a registered trademark of Gilbarco Inc. In such a case, a customer refueling two tanks with a master/satellite dispenser pair would be able to make a single payment at the pump for the combined transaction.

As previously mentioned, the present invention may take the form of an array of refueling stations wherein multiple master/satellite dispenser pairs are inter-linked to provide multiple lanes for refueling. FIG. 3 illustrates an array of refueling stations, 5, 5*a*, and 5*b*. Refueling station 5 is between housings 10 and 10'. Refueling station 5*a* is between housings 8 and 10 and provides access to master dispenser 27 and satellite dispenser 28, which are electronically connected by twisted pair wire set 20*a*. Similarly, refueling station 5*b* is between housings 10' and 10Δ and provides access to master dispenser 26' and satellite dispenser 28Δ, which are electrically connected by twisted pair wire set 20*b*. As stated previously, it will be appreciated by those skilled in the art that this inter-linked design can be repeated an infinite number of times to create an infinite number of refueling stations with the increase being limited only by the physical limitations of the host facility. For purpose of illustration, however, only three master/satellite refueling stations 5, 5*a*, and 5*b*, are shown in FIG. 3. The distances between housings 8 and 10, between housings 10 and 10', and between housings 10' and 10Δ may be any predetermined distance—d—, provided distance—d— is sufficient to accommodate a truck, recreational vehicle, or other multi-tank vehicle for refueling.

According to the preferred embodiment of the present invention, housing 8 contains only a master dispenser 27. As shown in FIG. 3, housing 10Δ contains only a satellite dispenser 28Δ. FIG. 4 illustrates a partial diagrammatic view of an array of refueling stations with an emphasis on refueling station 5*b* and an alternative embodiment of housing 10Δ. More specifically, housing 10Δ may also contain a master dispenser 26Δ. In such a case, master dispenser 26Δ would operate as a conventional, stand-alone fuel dispenser.

In operation, and with reference generally to FIGS. 1 through, 4, a multi-tank vehicle may enter any one of refueling stations 5, 5*a*, or 5*b* between a master dispenser in one housing and a satellite dispenser in another housing. A fuel hose from the master dispenser is connected to one tank of the vehicle and a fuel hose from the satellite dispenser is connected to another tank of the vehicle. Fuel is then simultaneously dispensed to each of these tanks. A dispenser control circuitry in the master dispenser controls the fuel valves in the master dispenser and the satellite dispenser.

A meter in the master dispenser measures the volume of fuel dispensed from the master dispenser. Likewise, a meter in the satellite dispenser measures the volume of fuel dispensed from the satellite dispenser. Transactional circuitry in each satellite dispenser communicates the volume data from each meter to the dispenser control circuitry in the master dispenser. The volume data from each dispenser is combined or added in the dispenser control circuitry. The combined data is then transmitted to a display device for displaying the total volume and total price of fuel dispensed from the master/satellite dispenser pair. If the display device is equipped with a payment card reader, the customer can pay for the entire transaction with one payment. In addition, with this dispensing and control system, a conventional vapor recovery system will operate properly in both the master and satellite dispensers.

In this manner, the present invention provides the ability to utilize electronic vapor control at both the master and satellite dispensers, enjoy maximum flow rate at both the master and satellite dispensers, and have a single transaction total displayed for a simultaneous refueling event. The present invention also enables the customer to pay for the total transaction at the pump if the dispenser is equipped with a payment card reader. Further, the present invention may be easily installed or retrofitted at existing fueling stations with a minimum of cost.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A method of simultaneously fueling two tanks in a vehicle and displaying at least the volume and price of the total amount of fuel dispensed to the vehicle, the method comprising the steps of:

(a) establishing electronic communication between a first master fuel dispenser and a second satellite fuel dispenser;

(b) positioning the vehicle between the first master fuel dispenser and the second fuel dispenser;

(c) connecting a fuel hose from the first master fuel dispenser to one tank of the vehicle;

(d) dispensing fuel to the vehicle from the first fuel dispenser;

(e) connecting a fuel hose from the second satellite fuel dispenser to another tank of the vehicle;

(f) dispensing fuel simultaneously to the vehicle from the second satellite fuel dispenser;

(g) measuring the volume of fuel dispensed from the first master fuel dispenser;

(h) measuring the volume of fuel dispensed from the second satellite fuel dispenser;

(i) combining the volume measurements from the first and second satellite fuel dispensers; and (j) displaying at least the total combined volume and price of fuel dispensed to the vehicle from the first master and second satellite fuel dispensers at said first master or said second satellite fuel dispenser.

2. A method of simultaneously fueling two tanks in a vehicle and displaying at least the volume and price of the total amount of fuel dispensed to the vehicle according to claim 1 wherein steps (d) and (f) further comprise the step of controlling the dispensing of fuel from the first master and second satellite fuel dispensers with dispenser control circuitry in the first master fuel dispenser.

3. A method of simultaneously fueling two tanks in a vehicle and displaying at least the volume and price of the total amount of fuel dispensed to the vehicle according to claim 1 wherein step (i) further comprises the steps of:

(1) transmitting volume measurements and fuel price from the first master fuel dispenser to dispenser control circuitry in the first satellite fuel dispenser;

(2) transmitting volume measurements and fuel price from the second satellite fuel dispenser to dispenser control circuitry in the first master fuel dispenser; and (3) combining the volume measurements and fuel prices from the firsts master and second satellite fuel dispensers in the dispenser control circuitry to generate a combined volume measurement and combined price for fuel dispensed to the vehicle from the first master and second satellite fuel dispensers.

4. A method of simultaneously fueling two tanks in a vehicle and displaying at least the volume and price of the total amount of fuel dispensed to the vehicle according to claim 1 and further comprising the step of:

(k) enabling a person to pay for the total combined volume and price of fuel dispensed from the first master and second satellite fuel dispensers with one payment at a payment card reader installed at the first satellite fuel dispenser.

5. A method of simultaneously fueling two tanks in a vehicle and displaying at least the volume and price of the total amount of fuel dispensed to the vehicle according to claim 1 and further comprising the steps of:

(k) detecting first master fuel vapor emissions at the connection point between the fuel hose of the first fuel dispenser and the vehicle;

(1) detecting second fuel vapor emissions at the connection point between the fuel hose of the seconded satellite fuel dispenser and another tank of the vehicle;

(m) recovering a majority of the first master fuel vapor emissions; and (n) recovering a majority of the second satellite fuel vapor emissions.

6. A method of simultaneously fueling two tanks in a vehicle and displaying at least the volume and price of the total amount of fuel dispensed to the vehicle according to claim 1 wherein step (a) further comprises the steps of:

(1) placing a first master fuel dispenser and a second fuel dispenser in a multi-dispenser housing;

(2) arranging a plurality of multi-dispenser housings in an array with a physical distance between each multi-dispenser housing sufficient to accommodate a vehicle between each multi-dispenser housing and sufficient to accommodate a plurality of vehicles within the array; and (3) establishing electronic communication between the first satellite fuel dispenser in one multi-dispenser housing with the second satellite fuel dispenser in an adjacent multi-dispenser housing.

7. A method of simultaneously fueling two tanks in a vehicle and displaying at least the volume and price of the total amount of fuel dispensed to the vehicle according to claim 6 and further comprising the steps of:

(4) placing a single dispenser housing with a first master fuel dispenser at one end of the array of multi-dispenser housings; and (5) placing a single dispenser housing with a second satellite fuel dispenser at the other end of the array of multi-dispenser housings.

8. A method of simultaneously fueling two tanks in a vehicle and displaying at least the volume and price of the total amount of fuel dispensed to the vehicle according to claim 6 and further comprising the steps of:

(4) placing a single dispenser housing with a first master fuel dispenser at one end of the array of multi-dispenser housings; and (5) placing a multi-dispenser housing at the other end of the array of multi-dispenser housings, wherein the first master fuel dispenser of the multi-dispenser housing at the other end of the array is a stand-alone fuel dispenser.

* * * * *